Oct. 20, 1953   J. C. HEWITT, JR   2,656,505
DIRECTIONAL INDICATING INSTRUMENT
Filed May 9, 1949
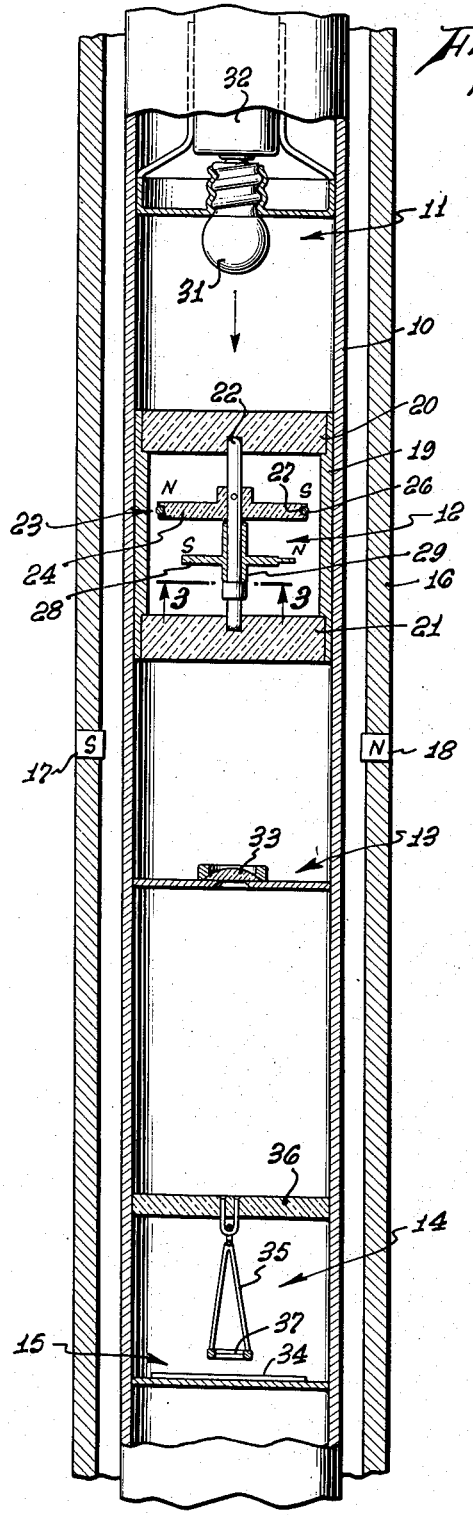
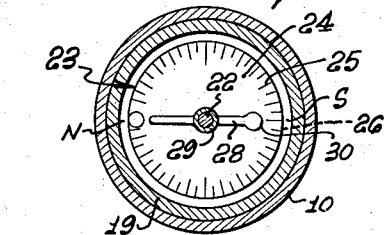
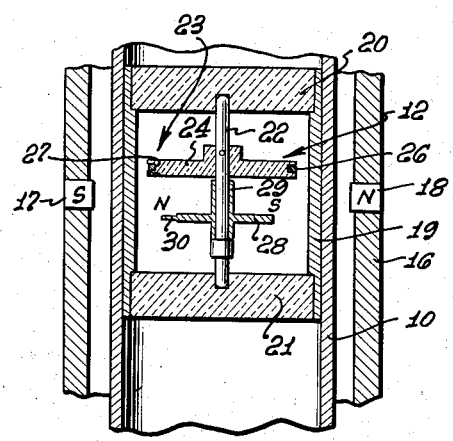
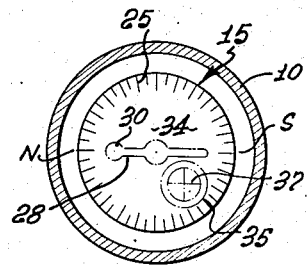
INVENTOR.
JOHN C. HEWITT, JR.
BY
ATTORNEY.

UNITED STATES PATENT OFFICE 2,656,505

DIRECTIONAL INDICATING INSTRUMENT

John C. Hewitt, Jr., Long Beach, Calif.

Application May 9, 1949, Serial No. 92,233

9 Claims. (Cl. 324—48)

This invention relates generally to improvements in directional indicating or recording instruments employing a magnetic compass from the position of which, as in relation to a reference object, may be obtained a directional or azimuthal determination. The invention is directed particularly to certain important advances in well surveying instruments used for such purposes as the orientation of the instrument in the well, orientational location of an object extraneous to the instrument, or orientation of the well course itself. As an illustrative adaptation, the invention will be described as embodied in a well surveying instrument operable to produce a photographic record of a contained compass element.

It has been conventional practice to use this type of instrument for determination of the azimuthal location in the well of a magnetic object, such as the drill pipe or tool within which the instrument is lowered, or such other specific bodies as a metallic fish or magnetized marker or reference insert carried by the object to be surveyed. The general method employed is to lower the instrument to a depth bringing its compass opposite the magnetic body and then photographing or otherwise recording the compass position, all with the supposition that the compass accurately points toward and therefore indicates the location of the magnetic object.

Practical operations have demonstrated however, that the compass position recording does not in all instances give a true directional indication of the object being surveyed. Error may arise for any of various reasons. As an example, assume the purpose of the survey to be that of directionally locating a fish lodged at a location in the side of the well coincident with a well bore diameter aligned with the earth's magnetic poles. Since the instrument compass normally alines itself with respect to the earth's magnetic field, that alinement might not appreciably be affected with the compass lowered opposite the fish, and consequently a record taken at that depth would not itself indicate whether at the time of recording, the instrument had been lowered to proper position, or had been lowered to some different location sufficiently remote from the fish as to be unaffected by its magnetic properties. To cite another example, where the instrument is used to determine the orientation of a magnetized insert in one side of a tool or drill string, through inaccurate operations the instrument may not have been lowered to the proper depth opposite the insert, at the time when the record is taken. The result may be an assumed, but erroneous, reading since the recorded image of the compass does not itself show whether the proper recording position had been reached by the instrument.

My primary object is to provide an improved direction finding instrument capable of producing a record which itself distinguishes between a recording of the earth's polarity, as compared with the azimuthal position of a magnetized object in the well. Pursuant to the invention, I employ a pair of compass elements mounted preferably in tandem arrangement for rotation about a common axis, and in sufficiently close proximity that the compass elements are mutually attracted one by the other. Specifically, their mutual magnetic attraction is such that normally, that is when influenced only by the earth's magnetic field, they assume opposite polarity, the south pole of one element being brought opposite and in substantial alinement with the north pole of the other element. To effect such relation, one of the compass elements may be more strongly magnetized so as normally to govern the position of a second and less strongly magnetized element, the latter thus becoming a "tell-tale" which shows by its variances from the stated normal relation of the elements, the presence of a magnetic influence other than the earth's magnetic attraction. As will appear, suitable provision may be made for recording the relative positions of the compass elements, as for example an appropriate light source and recording film arrangement.

From the foregoing it will be understood that while the instrument initially is being lowered in the well with the compass elements solely under the influence of the earth's magnetic field, the elements will remain in aligned opposite polar relation, and that a record taken under such conditions will indicate the absence of magnetic influence other than that of the earth's field. When however, the instrument is brought opposite a magnetic body, the resulting attraction tends to bring the more strongly magnetized element into directional alinement with that body, while at the same time causing the tell-tale element to deflect from its normal position of alinement with the primary compass, to a degree dependent upon the strength of the extraneous magnetic attraction. Where the external object is strongly magnetic, the relative positions of the compasses will be completely reversed, bringing their poles into correspondence, whereas in other instances, the relative deflection of the tell-tale compass may be only partial. In either instance, the recorded positions of the compass elements show definitely the presence of the extraneous magnetic object and its direction.

These various objects of the invention, as well as the details of a typical and illustrative embodiment, will be explained to better advantage in the following more detailed description of the accompanying drawing, in which:

Fig. 1 is a sectional view showing the instrument lowered typically in a pipe string to be oriented, and with the instrument away from predetermined recording position thereon;

Fig. 2 is a fragmentary view showing the compass needle assembly in recording position as influenced by a magetized element carred by the pipe string;

Fig. 3 is a view taken from line 3—3 of Fig. 1 and illustrating the relative positions of the compass elements; and Fig. 4 shows a typical inclination and azimuth recording taken on the light sensitive recording element.

Referring first to Fig. 1, the recording instrument is shown to comprise a suitable housing illustrated typically as a cylindrical non-magnetic case 10 containing a light source 11, compass needle assembly 12, light directing lens means 13, an inclination indicator 14 and an appropriate recording means 15. While it is understood that the invention and instrument are adaptable for running well surveys for various different purposes and under conditions varying accordingly, as a typical adaptation I have shown the instrument to be run down in a pipe string 16 whose orientation and inclination are to be determined at a predetermined depth, the illustrated section of the string being magnetic or non-magnetic and carrying a strongly magnetized element or insert conventionally indicated at 17, or a pair of diametrically opposed magnetized inserts 17 and 18.

The invention is concerned primarily with the compass assembly 12 and its structural and functional relationships to other parts of the instrument and the operating environment, all as will later appear. In the illustrative form shown, the compass elements proper are mounted in a suitable container 19 inserted and held in fixed position within the instrument case 10, the container 19 having translucent or transparent top and bottom ends 20 and 21. Shaft 22, supported and journaled for rotation in the container walls 20 and 21, carries a primary compass element 23 shown specifically in the form of a transparent or translucent disc 24 fixed to the shaft 22 and carrying the radial azimuth or angularity markings 25, see Fig. 3. The disc carries also a polar magnetized compass element which may be of the known segmental ring type 26 contained within a peripheral groove 27 in the disc, the north pole of the "needle" being suitably indicated as by the circle at N, and the diametrically opposed south pole by the marking at S. Shaft 22 supports a second compass element, which may serve essentially as a "tell tale" needle 28 carried by sleeve 29 rotatable about and relative to the shaft. Thus the two compass elements are mounted for independent and relative rotation.

In the illustrated assembly, the two compass elements are mounted axially in tandem arrangement and in such close proximity as to be mutually attracted each by the other, such attraction being sufficiently strong that when influenced only by the earth's magnetic field the north and south poles of the tell tale needle 28 are attracted respectively to the south and north poles of the primary compass element 23, with the poles of both compasses in substantially the same plane. Preferably the primary compass 23 will be relatively strongly magnetized and therefore may be said to be primarily controlling as to the directional indication given by the assembly. Being less strongly magnetized, the tell tale compass 28 normally or under the influence of a relatively weak magnetic attraction, such as the earth's magnetic field, is controlled by the primary element 24 to the extent of assuming an opposite polar position, as described. The polarity of the needle 28 may be suitably distinguished, as by giving its north pole the enlarged form indicated at 30.

When used in a recording instrument, the compass assembly 12 may be positioned below the light source 11, shown typically to comprise an electric lamp 31 energized by batteries 32 under suitable control, not shown. Light from the lamp passes through the translucent walls 20 and 21, and also through the primary compass disc 24 to the lens 33 from which the light is projected past the inclination indicator 14 to a light sensitive or photographic film 34. The inclination indicator is shown typically to comprise a plumb bob 35 suspended from the translucent support 36 and carrying a reticule with the cross hairs 37. As soon will be understood, the record taken on the film 34 will comprise the combined or superimposed images of the cross hairs 37, needle 28, and the angular markings and polar indicia of the primary compass 24.

In considering the operation of the instrument, assume first the compass assembly to be lowered to a depth at which it is subjected only to the earth's magnetic influence. Under such conditions the two compass elements will assume the relationship illustrated in Fig. 1, and their positions if recorded on the film 34 would appear to have the relationship illustrated in Fig. 3. It is important to observe that the resulting record would itself indicate the absence of any strong extraneous magnetic attraction. Should the compass needle assembly be lowered opposite a magnetic body such as a fish offset in the well, the presence and angular location of such attraction may be indicated notwithstanding the fact that its magnetic attraction may be insufficient to reverse the relative positions of the compasses. The presence of such attraction may deflect the tell tail needle 28 from polar alinement with the primary compass, because of the tendency for the corresponding poles of both compasses to aline with or point in the direction of the attraction. Thus while the angular position of the magnetic attraction will be indicated with substantial accuracy by the primary compass, deflection of the tell-tail needle from its Fig. 1, Fig. 3 position (though the deflection is less than complete reversal) will indicate and any record taken at such time will show, that the compass assembly position is influenced by an attraction other or greater than that of the eath's magnetic force.

Assume now the compass assembly to be lowered opposite the strongly magnetized element or elements 17, 18, as in Fig. 2. Here the extraneous magnetic attraction is sufficiently great to overcome the mutual attraction of the compasses to the extent of causing complete polar reversal of the tell-tale needle. Accordingly, a record taken will show the compass elements as illustrated in Fig. 4, where the corresponding poles appear in adjacent relation and all the poles in linear alinement. Assuming the instrument or tubing 16 to be inclined, the record will show also the offset position of the reticule and cross hairs 31. Accordingly, from the composite record may be determined both the orientation of the tubing and the direction of its inclination.

I claim:

1. A directional indicating instrument for use in wells, comprising a housing, a pair of magnetic compass elements mounted for rotation about a common vertical axis in the housing and having north and south poles in such proximate relation that the elements are mutually attractive, said elements being of such magnetic strengths and so relatively positioned that when subjected to only the earth's magnetic field one of said elements maintains the other in a position substantially completely reversed from that of the one element and from the position which said other element would assume in the absence of said mutual attraction, said housing being adapted to be lowered in a well to bring said elements opposite a magnetic material, the elements being of such magnetic strengths and so relatively positioned as to then be attractable to said material in substantially corresponding polar relation in which the relative positions of the elements are reversed from their positions assumed when subjected only to the earth's magnetic field, and means for indicating the relative positions of said elements as between their positions when subjected only to the earth's field and their positions in said corresponding polar relation.

2. A directional indicating instrument for use in wells, comprising a housing, a pair of magnetic compass elements mounted for rotation about a common vertical axis in the housing and having north and south poles in such proximate relation that the elements are mutually attractive, one of said elements being magnetized sufficiently more strongly than the other that when subjected to only the earth's magnetic field said one element maintains the other in a position substantially completely reversed from that of the one element and from the position which said other element would assume in the absence of said mutual attraction, said housing being adapted to be lowered in a well to bring said elements opposite a magnetic material, the elements being of such magnetic strengths and so relatively positioned as to then be attractable to said material in substantially corresponding polar relation in which the relative positions of the elements are reversed from their positions assumed when subjected only to the earth's magnetic field, and means in said housing for recording the relative positions of said elements.

3. A directional indicating instrument for use in wells, comprising a housing, a pair of magnetic compass elements mounted for rotation about a common vertical axis in the housing and having north and south poles in such proximate relation that the elements are mutually attractive, one of said elements being magnetized sufficiently more strongly than the other that when subjected to only the earth's magnetic field said one element maintains the other in a position substantially completely reversed from that of the one element and from the position which said other element would assume in the absence of said mutual attraction, a vertical shaft carrying one of said elements, the other element being supported by and rotatable about said shaft, said housing being adapted to be lowered in a well to bring said elements opposite a magnetic material, the elements being of such magnetic strengths and so relatively positioned as to then be attractable to said material in substantially corresponding polar relation in which the relative positions of the elements are reversed from their positions assumed when subjected only to the earth's magnetic field, and means in said housing for recording the relative positions of said elements.

4. In a directional indicating instrument, the combination comprising a pair of magnetic compass elements each having north and south magnetic poles mounted in such proximate relation that the elements are mutually attractive, said elements being of such magnetic strengths and so relatively positioned that when subjected to the earth's magnetic field one of said elements maintains the other in a position substantially completely reversed from that of the one element and from the position which said other element would assume in the absence of said mutual attraction, and said elements being of such magnetic strengths and so relatively positioned as to be relatively deflectible by a magnetic material in the vicinity of the instrument, said instrument including means for indicating the relative positions of said elements.

5. In a directional indicating instrument, the combination comprising a pair of magnetic compass elements each having north and south magnetic poles mounted in such proximate relation that the elements are mutually attractive, said elements being of such magnetic strengths and so relatively positioned that when subjected to the earth's magnetic field one of said elements maintains the other in a position substantially completely reversed from that of the one element and from the position which said other element would assume in the absence of said mutual attraction, and said elements being of such magnetic strengths and so relatively positioned as to be attractable to a magnetic material in the vicinity of the instrument in substantially corresponding polar relation in which the relative positions of the elements are reversed from their positions assumed when subjected to only the earth's magnetic field, said instrument including means for indicating the relative positions of said elements as between their positions when subjected only to the earth's field and their positions in said corresponding polar relation.

6. In a directional indicating instrument, the combination comprising a pair of magnetic compass elements mounted for rotation about a common vertical axis and having north and south magnetic poles in such proximate relation that the elements are mutually attractive, one of said elements being magnetized sufficiently more strongly than the other that when subjected to only the earth's magnetic field said one element maintains the other in a position substantially completely reversed from that of the one element and from the position which said other element would assume in the absence of said mutual attraction, said elements being of such magnetic strengths and so relatively positioned as to be attractable to a magnetic material in the vicinity of the instrument in substantially corresponding polar relation in which the relative positions of the elements are reversed from their positions assumed when subjected only to the earth's magnetic field, said instruments including means for indicating the relative positions of said elements as between their positions when subjected only to the earth's field and their positions in said corresponding polar relation.

7. In a directional indicating instrument, the combination comprising a pair of magnetic compass elements mounted for rotation about a common vertical axis and having north and south magnetic poles in such proximate relation that the elements are mutually attractive, one of said elements being magnetized sufficiently more strongly than the other that when subjected to only the earth's magnetic field said one element maintains the other in a position substantially completely reversed from that of the one element and from the position which said other element would assume in the absence of said mutual attraction, said elements being of such magnetic strengths and so relatively positioned as to then be attractable to said material in the vicinity of the instrument in substantially corresponding polar relation in which the relative positions of the elements are reversed from their positions assumed when subjected only to the earth's magnetic field, and means for recording the relative positions of said elements.

8. Well surveying apparatus comprising a section of tubing to be positioned in a well, an instrument body to be lowered into the well and into said section of tubing, a pair of magnetic compass elements mounted to the body for rotation about a common vertical axis and having north and south magnetic poles in such proximate relation that the elements are mutually attractive, said elements being of such magnetic strengths and so relatively positioned that when subjected to only the earth's magnetic field one of said elements maintains the other in a position substantially completely reversed from that of the one element and from the position which said other element would assume in the absence of said mutual attraction, and a magnetic insert in the wall of said section of tubing of a strength sufficient to attract the compasses, when brought opposite the insert, in substantially corresponding polar relation in which the relative positions of the elements are reversed from their positions assumed when subjected only to the earth's magnetic field.

9. Well surveying apparatus comprising a section of tubing to be positioned in a well, an instrument housing to be lowered into the well and into said section of tubing, a pair of magnetic compass elements mounted in the housing for rotation about a common vertical axis and having north and south magnetic poles in such proximate relation that the elements are mutually attractive, one of said elements being magnetized sufficiently more strongly than the other that when subjected to only the earth's magnetic field said one element maintains the other in a position substantially completely reversed from that of the one element and from the position which said other element would assume in the absence of said mutual attraction, a magnetic insert in the wall of said section of tubing of a strength sufficient to attract the compasses, when brought opposite the insert, in substantially corresponding polar relation in which the relative positions of the elements are reversed from their positions assumed when subjected only to the earth's magnetic field, and means in said housing for recording the positions of said elements.

JOHN C. HEWITT, Jr.

References Cited in the file of this patent

UNITED STATES PATENTS

| Number | Name | Date |
|---|---|---|
| 1,877,593 | Roman | Sept. 13, 1932 |
| 1,971,189 | Leibing | Aug. 21, 1934 |
| 2,120,670 | Hyer | June 14, 1938 |
| 2,123,045 | Hoare | July 5, 1938 |
| 2,169,342 | Hewitt | Aug. 15, 1939 |
| 2,187,367 | Smith | Jan. 16, 1940 |
| 2,319,212 | Cooley | May 18, 1943 |
| 2,419,468 | Smith | Apr. 22, 1947 |
| 2,461,864 | Zuschlag | Feb. 15, 1949 |
| 2,476,137 | Doll | July 12, 1949 |